United States Patent [19]

Lew et al.

[11] Patent Number: 4,703,659
[45] Date of Patent: Nov. 3, 1987

[54] VORTEX SHEDDING FLOW METER WITH NOISE SUPPRESSING AND SIGNAL ENHANCING MEANS

[75] Inventors: Hyok S. Lew, Arvada; Louis T. Yoshida, Longmont, both of Colo.

[73] Assignee: Engineering Measurements Company, Longmont, Colo.

[21] Appl. No.: 788,855

[22] Filed: Oct. 18, 1985

[51] Int. Cl.$^4$ .............................................. G01F 1/32
[52] U.S. Cl. ................................... 73/861.24; 73/189
[58] Field of Search ......... 73/861.22, 861.24, DIG. 4, 73/189

[56] References Cited

U.S. PATENT DOCUMENTS

| | | | |
|---|---|---|---|
| 2,813,424 | 11/1957 | Liepmann et al. | 73/861.24 |
| 4,069,708 | 1/1978 | Fussell, Jr. | 73/861.24 |
| 4,248,098 | 2/1981 | Sawayama et al. | 73/861.24 |
| 4,258,565 | 3/1981 | Sawayama et al. | 73/DIG. 4 |
| 4,307,619 | 12/1981 | Herzl | 73/861.24 |
| 4,391,137 | 7/1983 | Kerfoot et al. | 73/204 |

FOREIGN PATENT DOCUMENTS

| | | | |
|---|---|---|---|
| 0148470 | 12/1978 | Japan | 73/861.22 |
| 0161968 | 12/1979 | Japan | 73/861.24 |
| 0161357 | 12/1979 | Japan | 73/861.24 |
| 0156811 | 12/1983 | Japan | 73/861.24 |

Primary Examiner—Herbert Goldstein
Attorney, Agent, or Firm—James R. Young

[57] ABSTRACT

This invention discloses a vortex shedding flowmeter comprising a vortex generating member disposed across one cross section of the flow passage and a pair of vortex sensing wings respectively disposed across two cross section of the flow passage straddling the vortex generating member in a parallel relationship thereto, wherein one extremity of each wing is secured to a stocky container member housing a piezo-electric element by a flange of a thin diaphragm construction, which stocky container member is rigidly secured to the wall of the flow passage, while the other extremity of each wing is secured to the opposite side wall of the flow passage in a resilient manner.

12 Claims, 33 Drawing Figures

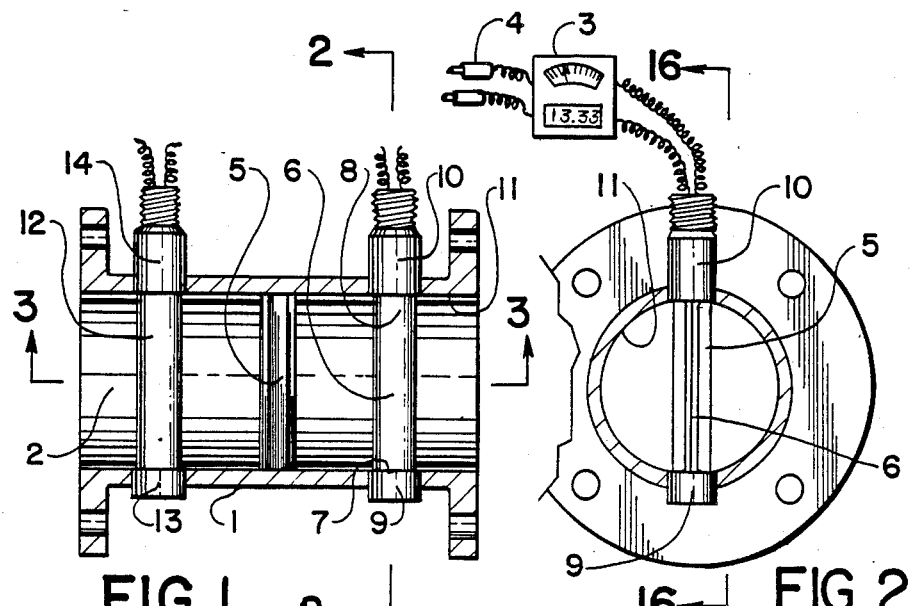
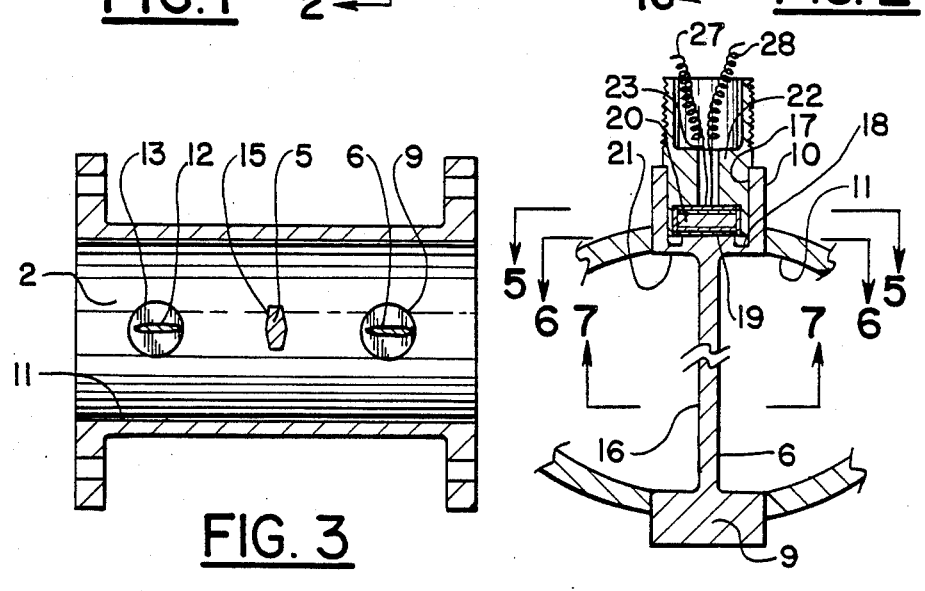

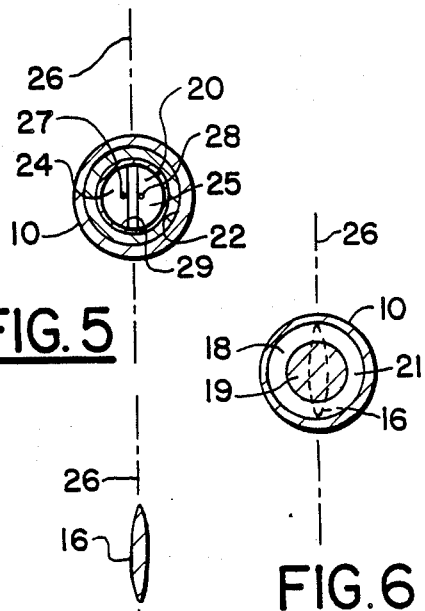
FIG. 5
FIG. 6
FIG. 7
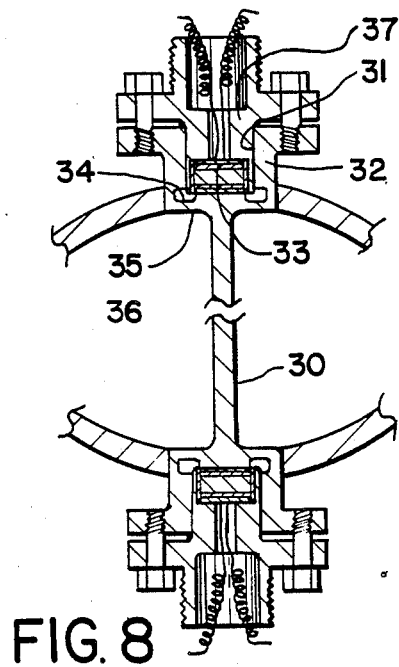
FIG. 8
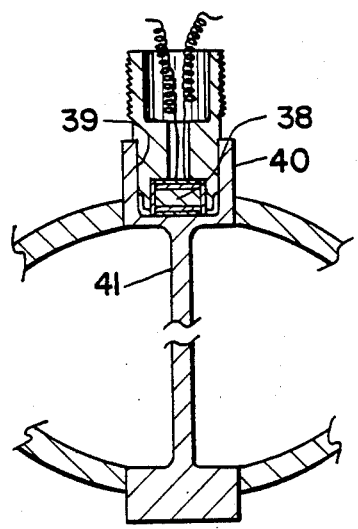
FIG. 9
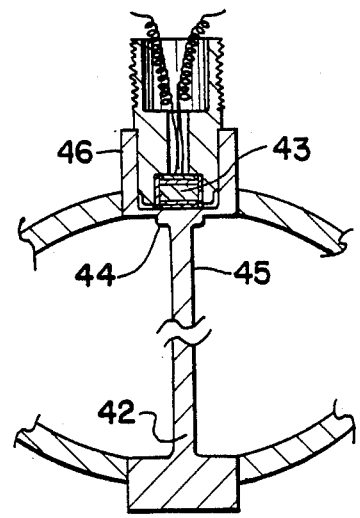
FIG. 10

VORTEX SHEDDING FLOW METER WITH NOISE SUPPRESSING AND SIGNAL ENHANCING MEANS

BACKGROUND OF THE INVENTION

The technology in vortex shedding type flow meters has been making a remarkable progress in recent years. As a matter of fact, the vortex shedding flow meter is emerging as one of the most rugged and reliable flow measurement devices providing flow data with remarkably good accuracy. The vortex shedding flow meters commercially available at the present time have two fundamental weaknesses, which are, firstly, those existing vortex shedding meters lack the sensitivity required to measure flows of gaseous media at low velocities and, secondly, they are highly susceptible to noises created by the mechanical vibrations of pipe assemblies, acoustical noises transmitted through the ambient surroundings, etc. There are vortex shedding flow meters utilizing ultrasonic waves to detect the vortex shedding frequencies, which method is supposed to eliminate the problem of interference by the mechanical vibrations. However, the ultrasonic means for detecting the vortex shedding frequencies introduce other problems and limitations of far more serious nature compared with the mechanical noise problem, which includes the error introduced by the bubbles and particles suspended in the fluid medium, serious compromise on ruggedness and durability, temperature and/or pressure limitations in the application, etc.

The primary object of the present invention is to provide a vortex shedding flow meter capable of measuring flow velocities in very wide ranges from very low velocities to very high velocities.

Another object is to provide a vortex shedding flow meter of high sensitivity and high accuracy.

A further object is to provide a vortex shedding flow meter having a high degree of noise suppressing capability.

Yet another object is to provide a vortex shedding flow meter of highly rugged and durable construction, and dependable and consistent performance.

Yet a further object is to provide a vortex shedder flow meter having a wide range of applications including extreme temperatures and/or extreme pressures.

Still another object is to provide a bidirectional vortex shedding flow meter that measures flow velocities in both directions.

Still a further object is to provide a bidirectional vortex shedder flow meter including a vortex generating member of stiff elongated structure having a blunt cross section and a pair of vortex sensing members of slender elongated geometry with substantially flat cross section disposed parallel to the vortex sensing member at an upstream and a downstream position thereof, respectively.

Additionally another object is to provide a bidirectional vortex shedder flow meter including a noise canceling feature wherein the noise signals sensed by the two vortex sensing members respectively disposed at an upstream and a downstream of the vortex generating member cancel each other while the vortex shedding signals sensed by the downstream vortex sensing member provides data on flow velocities.

Additionally a further object is to provide a bidirectional vortex shedding flow meter including a pair of vortex sensing members with substantially flat midsection extending to stocky extremity experiencing an abrupt change in cross section; whereby a small amount of the lateral deflection of the substantially flat midsection of the vortex sensing member created by the vortices produces a high stress concentration at the junction of discontinuous transition in the cross section.

It is also the object of the present invention to provide a vortex shedding flow meter including transducer means installed adjacent to the junction of discontinuous transition in the cross section, wherein the transducer means converts the mechanical signal of vortex shedding to electrical signal.

These and other objects of the present invention will become clear as the description thereof proceeds.

BRIEF DESCRIPTION OF THE FIGURES

The present invention may be described with a great clarity and specificity by referring to the following figures:

FIG. 1 illustrates a cross section of an embodiment of a vortex shedding flow meter constructed in accordance with the principles of the present invention.

FIG. 2 illustrates another cross section of the vortex shedding flow meter shown in FIG. 1 taken along plane 2—2 as shown in FIG. 1.

FIG. 3 illustrates a further cross section of the vortex shedding flow meter shown in FIG. 1.

FIG. 4 illustrates a cross section of an embodiment of the vortex sensor assembly taken along a plane equivalent to plane 2—2 as shown in FIG. 1.

FIG. 5 illustrates another cross section of the vortex sensor assembly shown in FIG. 4 taken along plane 5—5 as shown in FIG. 4.

FIG. 6 illustrates a further cross section of the vortex sensor assembly shown in FIG. 4 taken along plane 6—6 as shown in FIG. 4.

FIG. 7 illustrates yet another cross section of the vortex sensor assembly shown in FIG. 4 taken along plane 7—7 as shown in FIG. 4.

FIG. 8 illustrates a cross section showing an embodiment of the installation of a transducer element in the vortex sensor assembly.

FIG. 9 illustrates a cross section showing another embodiment of the installation of a transducer element in the vortex sensor assembly.

FIG. 10 illustrates a cross section showing a further embodiment of the installation of a transducer element in the vortex sensor assembly.

DESCRIPTION OF ILLUSTRATED EMBODIMENT

Figure 11:
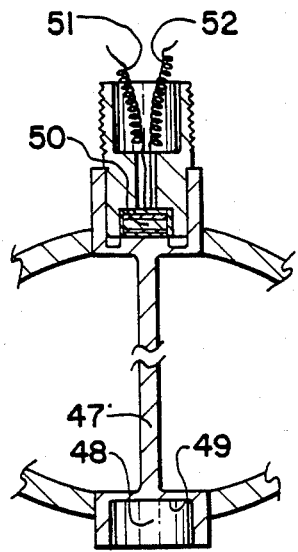
FIG. 11 illustrates a cross section of a vortex sensor assembly showing the transition from the substantially flat midsection to two stocky extremities affixed to the wall of the flow passage.

In FIG. 1 there is illustrated a cross section of an embodiment of the vortex shedding flow meter constructed in accordance with the principles of the present invention, which cross section is taken along a plane including the central axis of the flow passage. The flow meter body 1 includes a straight-through flow passage 2 that extends from one extremity to the other extremity of the flow meter body 1 wherein each extremity includes coupling means for connecting the flow meter to a pipe line. A vortex generating member 5 of a stiff elongated structure with cross section of a blunt geometry is disposed across a cross section of the flow passage 2 in a substantially perpendicular angle with respect to the central axis of the flow passage 2. The two extremities of the vortex generating member 5 are affixed to two diametrically opposite portions of the wall of the flow passage in a nonremovable fashion by such means as the weld connection shown in the specific embodiment in FIG. 1 or in a removable fashion by such means as pin or bolt connections shown in the specific embodiment in FIG. 33. A first vortex sensing member 6 having a slender elongated midportion structure is disposed across another cross section of the flow passage 2 in a parallel arrangement with respect to the vortex generating member 5. As shown in FIG. 3, the slender, elongated midportion of this first vortex sensing member 6 preferably has a transverse cross-section that is thin in dimension transverse to the central axis of the flow passage 2 and is wide in dimension parallel to the central flow passage 2. The two extremities 7 and 8 of the slender, elongated midportion of the vortex sensing member 6 extend to stocky extremities 9 and 10, respectively, experiencing abrupt changes in cross section from the substantially flat cross section to a broader cross section. The stocky extremities 9 and 10 of the vortex sensing member 6 are rigidly affixed to the two diametrically opposite portions of the wall 11 of the flow passage 2. One of the two stocky extremities 10 of the vortex sensing member 6 includes a transducer element housed therein, which arrangement will be described in conjunction with FIG. 4.

A second vortex sensing member 12 of slender elongated midportion structure is disposed across a further cross section of the flow passage 2 in a parallel arrangement with respect to the vortex generating member 5, placing the vortex generating member 5 intermediate the two vortex sensing members 6 and 12. As shown in FIG. 3, the slender, elongated midportion of this second vortex sensing member 12 also preferably has a transverse cross-section that is thin in dimension transverse to the central axis of the flow passage 2 and is wide in dimension parallel to the central flow passage 2. The slender, elongated midportion of the vortex sensing member 12 extends to two stocky extremities 13 and 14, wherein a transducer element is housed in one of the two stocky extremities 14. The signals on the vortex shedding frequencies detected by and transmitted from the transducer element installed within the stocky container member of the vortex sensing member located downstream to the vortex generating member is processed by a data processor 3 that converts the vortex shedding frequency to rate of flow through the flow passage which data are displayed and/or transmitted to other flow measuring or controlling device by an output means 4.

In FIG. 2 there is illustrated a cross section of the vortex shedding flow meter shown in FIG. 1, that is taken along plane 2—2 as shown in FIG. 1. The slender, elongated midportion of the vortex sensing member 6 substantially lined up with the central axis of the flow passage contrasts the vortex generating member 5 having cross section of a blunt geometry where the blunt side of the vortex generating member 5 is disposed substantially perpendicular to the central axis of the flow passage. The other vortex sensing member 12 having the same construction as the vortex sensing member 6 is installed behind the vortex generating member 5 in the same arrangement as the vortex sensing member 6 in this view of the vortex shedding flow meter.

In FIG. 3 there is illustrated another cross section of the vortex shedding flow meter shown in FIG. 1, which is taken along plane 3—3 as shown in FIG. 1. The cross section of a blunt geometry of the vortex generating member 5 is arranged in such a way that the broad side 15 of the vortex generating member 5 is disposed substantially perpendicular to the central axis of the flow passage 2, obstructing the flow path. The slender, substantially flat cross sections of the midportions of the vortex sensing members 6 and 12 are lined up with the central axis of the flow passage 2. In general, construction of the vortex shedding flow meter of the present invention in a symmetric arrangement with respect to the cross section of the flow passage 2 including the center line of the vortex generating member provides an advantage in that the vortex shedding flow meter of the symmetric construction is capable of measuring the fluid flow moving in either of the two directions through the flow passage 2. The dual sensor system, including the two vortex sensing members 6 and 12, provide advantages in terms of the bidirectional flow measurement as well as in terms of the mechanical noise canceling capability. Therefore the construction of the vortex shedding flow meter, including the dual vortex sensing system as shown in FIG. 3, may also be employed to construct a one-way vortex shedding flow meter having excellent noise suppressing characteristics. For example, one may employ vortex sensing members having asymmetric cross sections such as that shown in FIG. 25.

In FIG. 4 there is illustrated a cross section of the vortex sensing member 6 taken along a plane including the central axis of the vortex sensing member 6 and perpendicular to the central axis of the flow passage. The slender, elongated midportion 16 of the vortex sensing member 6 extends to one stocky extremity 9 experiencing a sharp change in the cross section geometry, while it extends to the other stocky extremity 10 also experiencing a sharp change in the cross section geometry. Both of the stocky extremities extend through and are rigidly affixed to the two diametrically opposite portions of the wall 11 of the flow passage. The stocky container member 10 includes a bore 17 that has a bottom with an annular groove 18, providing a raised seat 19 for the transducer element 20 and an annular diaphragm 21 that resiliently connects the rigid combination of the slender, elongated midportion 16 and the raised seat 19 to the shell-like structure of the stocky container member 10. A transducer holding member 22 with a hole 23 for wiring plugs up the bore 17 wherein the transducer element 20 placed on the raised seat 19 is preloaded against the raised seat 19 by the transducer holding member 20 that is pressed down against the transducer element 20 seating on the raised seat 19 and weld-connected to the end of the stocky container member 10 of the vortex sensing member 6. The other vortex sensing member 12 having the same construction and arrangement as the vortex sensing member 6 includes a transducer element housed in its stocky container member 14 in the same way as shown in FIG. 4.

In FIG. 5 there is illustrated a cross section of the combination of the stocky container member 10 of the vortex sensing member 6 and the transducer holding member 22, which cross section is taken along plane 5—5 as shown in FIG. 4, showing the top of the transducer element 20 of a circular disc shape. The transducer element 20 includes a pair of sensors 24 and 25 divided from one another along a plane substantially including the central axis 29 of the flow passage 11, from which a pair of conducting wires 27 and 28 extend, respectively. The transducer element 20 is electrically insulated from the stocky container member 10 of the vortex sensing element and the transducer holding member 22 by means of a pair of insulating discs sandwiching the transducer element and an insulating sleeve 29.

In FIG. 6 there is illustrated another cross section of the stocky extremity 10 of the vortex sensing member taken along plane 6—6 as shown in FIG. 4. The annular groove 18 provides a resilient annular diaphragm 21 connecting the combination of the raised seat 19 and the slender, elongated midportion 16 of the vortex sensing member to the shell-like structure of the stocky container member 10.

In FIG. 7 there is illustrated a cross section of the flat midsection 16 of the vortex sensing member 6 that is substantially lined up with the central axis 26 of the flow passage. The vortex shedding flow meter illustrated in FIGS. 1-7 operates in the following principles: The vortex generating member 5 generates a train of vortices in the wake downstream thereof, which are shed from the two opposite sides of the vortex generating member 5 in an alternating pattern at a frequency that is directly proportional to the velocity of the fluid medium moving through the flow passage divided by the width of the vortex generating member. The wake behind the vortex generating member including the train of vortices generates lift force on the slender, elongated midportion of one of the two vortex sensing members located downstream to the vortex sensign member that changes the direction at the same frequency as the vortex shedding. The lift forces of alternating directions deflect the slender, elongated midportion of the vortex sensing member in an oscillating mode at the same frequency as the vortex shedding and, consequently, the detection of the frequency of the alternating deflections of the slender, elongated midportion of the vortex sensing member enables one to detect the frequency of the vortex shedding, from which information about the velocity of the fluid medium and the volume or mass flow rate through the fluid passage is obtained.

The vortex sensing member constructed in accordance with the principles of the present invention provides a unique and powerful advantage in that the vortex sensing member described in conjunction with FIGS. 4-7 mechanically preamplifies the signal associated with the vortex shedding from the vortex generating member by means of stress concentration taking place at the discontinuous junction between the slender, elongated midportion and the stocky extremity of the vortex sensing member. As the slender, elongated midportion is supported by the thin annular diaphragm at the discontinuous junction in a resilient manner, the fluid dynamic force of low magnitude associated with the vortices creates deflection of the slender, elongated midportion of a magnitude easily measurable even in the low velocity regime.

Furthermore, the thin annular diaphragm provides only a little stiffness. Consequently, all the stress transferred from the slender, elongated midportion to the stocky container member of the vortex sensing member passes through the transducer element under a pressurized contact with the raised seat in a highly concentrated form. As a consequence, emf between the pair of conducting wires respectively extending from the two divided halves ia mechanically preamplified before it is electrically amplified and processed. The dual amplification comprising the aforementioned mechanical preamplication and the final electrical amplification and processing of the vortex shedding frequency enables the vortex shedding flow meter of the present invention to detect the vortices which are too weak to be detected by many other existing vortex shedding flow meters.

Another overwhelming advantage provided by the vortex shedding flow meter of the present invention is the noise elimination. The slender, elongated midportion of the vortex sensing member of light weight construction has a fixed end supported by the stocky extremity that is opposite the one housing the transducer element, while it has a quasi simple support at the junction connected to the stocky container member housing the transducer. In other words, it is equivalent to a small mass supported by a highly rigid spring, that has a large frictional damping surface. The natural resonance frequency of the slender, elongated midportion of the vortex sensing member is high above the operating range of the vortex shedding frequency. The large surface area to mass ratio of the wing of the vortex sensing member is unresponsive to the low frequency structural vibration of the piping system, while it provides a powerful advantage in detecting fluid dynamic force.

In other words, the particular embodiment of the vortex sensing member shown in FIG. 4 is sensitive to the fluid dynamic force because of its large streamlined surface area, while it is insensitive to the mechanical vibrations of external sources because of its small mass and because of its large fluid dynamic surface area that damps off rapidly any vibration induced by the mechanical vibration of external sources. The wires originating from the two transducer elements respectively included in the two vortex sensing members can be connected in such a way that noise signals detected by the two transducer elements cancel one another, which is another advantage of the dual vortex sensing system in addition to the bidirectional flow measurement.

In FIG. 8 there is illustrated a cross section of another embodiment of the vortex sensing member 30 constructed in essentially the same way as that shown in FIG. 4 with a few exceptions. The bore 31 included in the stocky container member 32 has a diameter slightly greater than the diameter of the transducer pack 33, wherein the annular groove 34 providing a resilient annular diaphragm 35 supporting the slender, elongated midportion 36 of the vortex sensing member 30 cuts into the bottom of the bore 31 as well as to the cylindrical wall thereof. The transducer retainer 37 is fastened to the stocky container member 32 of the vortex sensing member 30 by a plurality of bolts, which arrangement enables one to replace the transducer pack 33.

In the specific embodiment shown in FIG. 8, another transducer element is installed within a cavity included in the other stocky extremity of the vortex sensing member 30, which installation is arranged in the same way as the transducer element 33 is installed in a cavity included in the stocky container member 32 of the vortex sensing member 30. The dual transducer arrangement including a pair of transducers respectively included in the two stocky extremities of the vortex sensing member provides advantages in that, firstly, signals from the two transducer elements can be added to one another to increase the intensity of the signal indicating the vortex shedding frequency and, secondly, the polarization of the crystals included in the two transducer elements and wiring therebetween can be arranged in such a way that the two transducers add up one another in sensing and transmitting the vortex shedding signals, while they cancel each other on noise signals associated with the structural vibration of the pipe lines and other mechanical vibrations occuring in the ambient surroundings.

In FIG. 9 there is illustrated a cross section of a further embodiment of the vortex sensing member constructed in essentially the same way as that shown in FIG. 4 with one exception being that the transucer pack 38 is placed directly on the substantially flat bottom of the bore 39 included within the stocky container member 40 of the vortex sensing member 41. It should be noticed that there is a clearance between the bottom of the bore 39 and the tip of the transducer retainer as the tip of the transducer retainer is slightly recessed from the face of the transducer 38 under a pressure contact with the bottom of the bore 39.

In FIG. 10 there is illustrated a cross section of yet another embodiment of the vortex sensing member 42 which is constructed in essentially the same way as that shown in FIG. 9. The seating arrangement of the transducer pack 43 is reinforced by the shoulder structure 44 added to the junction where the slender, elongated midportion 45 of the vortex sensing member 42 extends to the stocky container member 46. It should be understood that different arrangements for the installation of the crystal pack constituting the transducer element shown in FIGS. 4, 8, 9 and 10 may include the transducer retainer permanently connected to the stocky container member housing the transducer element by welding or clamping or removably connected by a threaded fastening means.

In FIG. 11 there is illustrated a cross section of an embodiment of the vortex sensing member 47 constructed in essentially the same way as that shown in FIG. 4, wherein the stocky extremity 48 opposite to that housing the transducer element is bored out to provide a diaphragm 49, providing a quasi-simple support for the flat midsection of the vortex sensing member at both ends. Such an arrangement provides an increased flexibility for the flat midsection of the vortex sensing member and, consequently, boost the level of the mechanical preamplification of the vortex shedding signal picked up by the transducer element 50 in the form of emf between the two conducting wires 51 and 52 extending from the two elements of piezo-electric sensors included in the transducer element 50.

Figure 12:
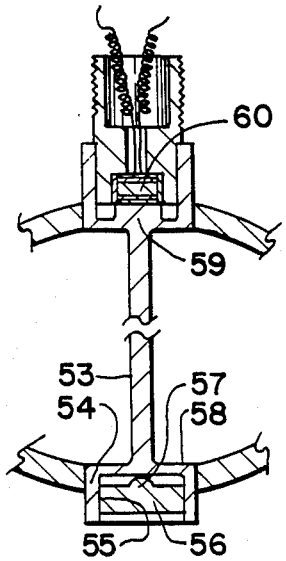
FIG. 12 illustrates another embodiment of the securement of the vortex sensing member to the wall of the flow passage.

In FIG. 12 there is shown another embodiment of the arrangement for the junction between the slender, elongated midportion 53 of the vortex sensing member and the stocky extremity 54, wherein the bore 55 included in the stocky extremity 54 has a plug 56 welded thereto as shown or can be threadedly fastened thereto. The plug 56 includes a centrally located boss or ridge 57 lined up parallel to the cross section of the flat midsection 53, that supports the diaphragm 58 without hindering the flexing movement of the flat midsection 53 of the vortex sensing member. The inclusion of the plug 56 with a supporting boss or ridge 57 serves a dual purpose in that it maintains a positive pressure between the raised seat 59 and the transducer element 60 and that it supports the diaphragm 58 against the fluid pressure in the flow passage.

Figure 13:
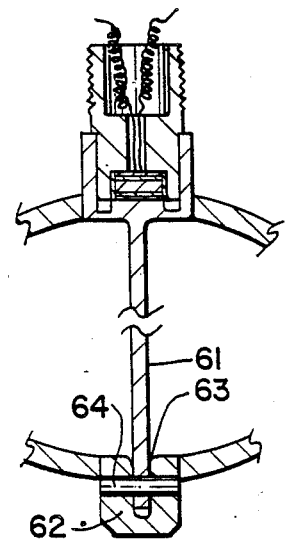
FIG. 13 illustrates a further embodiment of the securement of the vortex sensing member to the wall of the flow passage.

In FIG. 13 there is illustrated a further embodiment of the arrangement for the junction between the slender, elongated midportion 61 of the vortex sensing member and the stocky extremity 62 wherein the free extremity 63 of the slender, elongated midportion 61 engages a groove included in the stocky extremity 62 and secured thereto by a pin 64.

Figure 14:
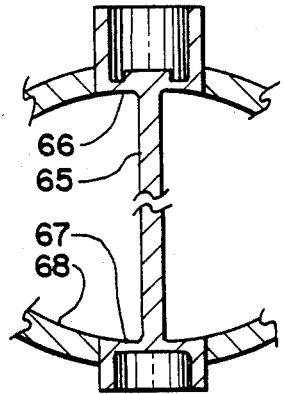
FIG. 14 illustrates yet another embodiment of the securement of the vortex sensing member to the wall of the flow passage.

In FIG. 14 there is illustrated yet another embodiment of the arrangement for the junction between the slender, elongated midportion 65 of the vortex sensing member and the stocky extremities thereof. The shoulders 66 and 67 included in the junctions are shaped to conform with the circular cylindrical surface of the wall 68 of the flow passage. For the brevity of the illustration, the transducer element and its retainer are omitted from the illustration shown in FIG. 14.

Figure 15:
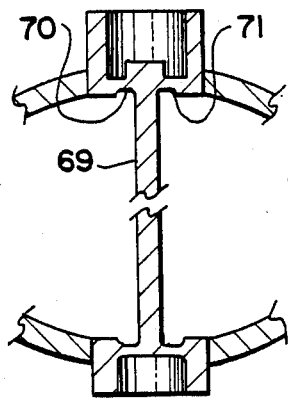
FIG. 15 illustrates yet a further embodiment of the securement of the vortex sensing member to the wall of the flow passage.

In FIG. 15 there is illustrated yet a further embodiment of the arrangement for the junction between the slender, elongated midportion 69 of the vortex sensing member and the stocky extremities thereof, wherein a pair of linear grooves 70 and 71 sandwiching the slender, elongated midportion 69 are incorporated into shoulders included in the junction. It should be understood that different combinations for the installation of the transducer element and those for the arrangement of the junctions between the slender, elongated midportion and the stocky extremities of the vortex sensing member shown in FIGS. 4-15 may be selectively and combinatorially utilized to construct a vortex sensing element particularly adapted to specific operating conditions.

Figure 16:
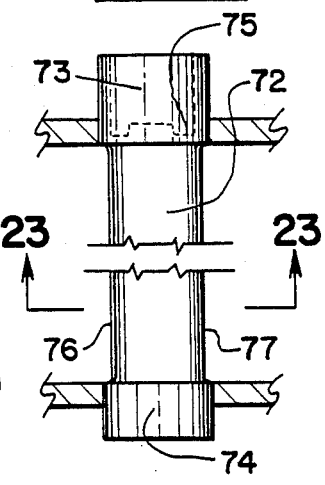
FIG. 16 illustrates a view of the vortex sensor assembly viewed across plane 16—16 as shown in FIG. 2.

In FIG. 16 there is illustrated a view of a substantially flat side of the slender, elongated midportion 72 of a vortex sensing element secured to the wall of the fluid passage by means of the two stocky extremities 73 and 74 affixed to the wall of the fluid passage by welding, which view is seen through plane 16—16 as shown in FIG. 2. It should be noticed that, in this particular embodiment, the cord length of the slender, elongated midportion 72 is slightly greater than the outer diameter of the annular diaphragm 75 and, consequently, the leading and trailing edges 76 and 77 are directly supported by the shell structure of the stocky container member 73.

Figure 17:
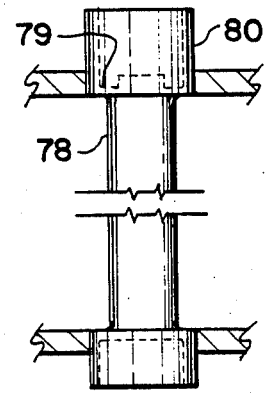
FIG. 17 illustrates a side view of an embodiment of the vortex sensing member.

In FIG. 17 there is illustrated a view of a substantially flat side of the slender, elongated midportion 78 of the vortex sensing element. The cord length of the slender, elongated midportion is less than the outer diameter of the annular diaphragm 79 and, consequently, in this particular embodiment, the extremity of the slender, elongated midportion extending to the stocky container member 80 housing the transducer element is more or less supported by the annular diaphragm 79 all around thereof.

Figure 18:
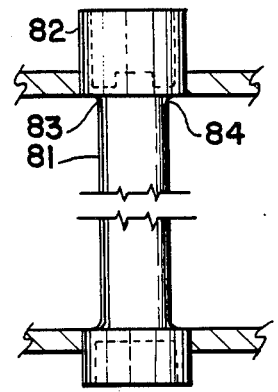
FIG. 18 illustrates a side view of another embodiment of the vortex sensing member.

In FIG. 18 there is illustrated a cross section of another embodiment of the junction where the slender, elongated midportion 81 extends to the stocky container member 82 housing the transducer element, which embodiment is essentially the same as that shown in FIG. 17 with one exception being that the radii 83 and 84 are included along the leading and trailing edges of the slender, elongated midportion at the junction between the slender, elongated midportion 81 and the stocky container member 82, whereby, the leading and trailing edges of the slender, elongated midportion are directly supported by the shell structure of the stocky container member 82.

Figure 19:
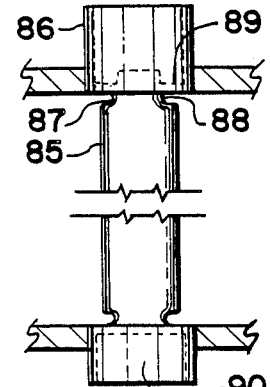
FIG. 19 illustrates a side view of a further embodiment of the vortex sensing member.

In FIG. 19 there is illustrated a cross section of another embodiment of the junction where the slender, elongated midportion 85 extends to the stocky container member 86 housing the transducer element. The noches or undercuts 87 and 88 are cut into the leading and trailing edges of the flat midsection at the junction between the slender, elongated midportion 85 and stocky container member 86 in order to provide a further resiliency for the annular diaphragm 89 supporting the slender, elongated midportion 85. A similar arrangement including notches or undercuts may be employed at the junction where the slender, elongated midportion 85 extends to the other stocky extremity 90 opposite to that housing the transducer element. The embodiments shown in FIGS. 16-19 are applicable to the construction of the vortex sensing element in a selective and conbinatorial manner, wherein the cord length of the slender, elongated midportion of the vortex sensing element is approximately equal to or less than the diameter of the stocky extremities of the vortex sensing element.

Figure 20:
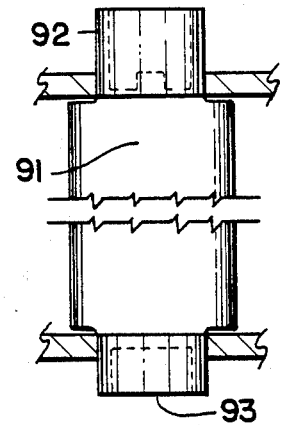
FIG. 20 illustrates a side view of yet another embodiment of the vortex sensing member.

In FIG. 20 there is illustrated a vortex sensing element wherein the cord length of the slender, elongated midportion 91 is greater than the diameter of the stocky extremities 92 and 93 of the vortex sensing element. At the junction where the flat midsection 91 extends to the stocky extremity, the leading and trailing edge portions of the slender, elongated midportion 91 are trimmed down to a width that matches the outside diameter of the stocky extremities.

Figure 21:
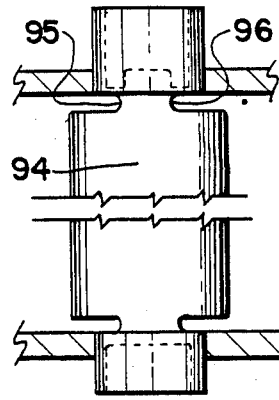
FIG. 21 illustrates a side view of yet a further embodiment of the vortex sensing member.

In FIG. 21 there is shown another vortex sensing element with the slender, elongated midportion 94 of large chord length that extends to the stocky extremities of small diameter, wherein notches or undercuts 95, 96, etc. are included along the leading and trailing edges of the slender, elongated midportion 94 at the junction where the slender, elongated midportion 94 extends to the stocky extremities. The notches or undercuts 95, 96, etc. accomplish the same goal as described in conjunction with FIG. 19.

Figure 22:
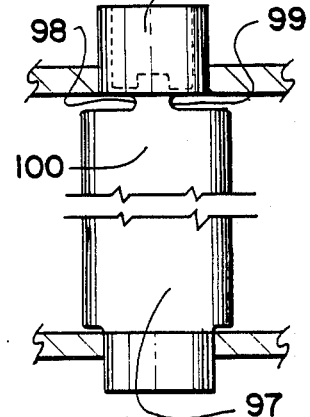
FIG. 22 illustrates a side view of still another embodiment of the vortex sensing member.

In FIG. 22 there is illustrated a further vortex sensing member 97 that is essentially the same as that shown in FIG. 21 with one exception being that the pair of notches or undercuts 98 and 99 are included at one junction only where the slender, elongated midportion 100 extends to the stocky container member 101 housing the transducer element. Such an arrangement is useful when a high level stress concentration is required in transmitting the stress to the transducer element while an adquate level of stiffness is required in supporting the slender, elongated midportion 100 by the stocky extremities of the vortex sensing member 97.

Figure 23:
FIG. 23 illustrates a cross section of a typical flat midsection of the vortex sensing member taken along plane 23—23 as shown in FIG. 6.

In FIG. 23 there is illustrated a cross section of the slender, elongated midportion of the vortex sensing member taken along a plane 23—23 as shown in FIG. 1. The cross section of the slender, elongated midportion 102 should be of a thin, flat geometry with a smooth contour that creates a minimum disturbance on the motion of the fluid medium flowing thereby. The thin flat geometry of the cross section of the slender, elongated midportion of the vortex sensing member is required, firstly, to generate lift forces of possibly the largest magnitude resulting from the vortices shed by the vortex generating member, secondly, to provide a sufficient flexibility necessary to produce deflections resulting in stresses of measurable magnitude, and thirdly, to minimize the inertia effect on ringing noises whereby the deflections induced by the mechanical noise are damped immediately because of the combination of a small mass and a large surface area of frictional damping.

Figure 24:
FIG. 24 illustrates a cross section of another embodiment of the flat midsection of the vortex sensing member.

In FIG. 24 there is illustrated a cross section of the slender, elongated midportion of another vortex sensing member 103, which has a finite camber that generates lift forces in alternating directions in an asymmetric mode. Alternating forces in an asymmetric mode sometimes provides an advantage for sensing the vortex shedding.

Figure 25:
FIG. 25 illustrates a cross section of a further embodiment of the flat midsection of the vortex sensing member.

In FIG. 25 there is illustrated a cross section of the slender, elongated midportion of a further vortex sensing member 104, which is a typical airfoil shape of zero camber.

Figure 26:
FIG. 26 illustrates a cross section of yet another embodiment of the flat midsection of the vortex sensing member.

In FIG. 26 there is illustrated a cross section of the slender, elongated midportion of yet another vortex sensing member 105 that is substantially of a flattened triangle with slightly rounded corners.

Figure 27:
FIG. 27 illustrates a cross section of yet a further embodiment of the flat midsection of the vortex sensing member.

In FIG. 27 there is illustrated a cross section of the slender, elongated midportion of yet a further vortex sensing member 106 that is substantially of a flattened diamond shape with slightly rounded corners.

Figure 28:
FIG. 28 illustrates a cross section of still another embodiment of the flat midsection of the vortex sensing member.

In FIG. 28 there is illustrated a cross section of the slender, elongated midportion of yet a further vortex sensing member 107 that is substantially of the shape of tilde mark. The typical cross sections shown in FIGS. 23-28 are a few examples of many that can be incorporated into the construction of the slender, elongated midportion of the vortex sensing member as a matter of design.

Figure 29:
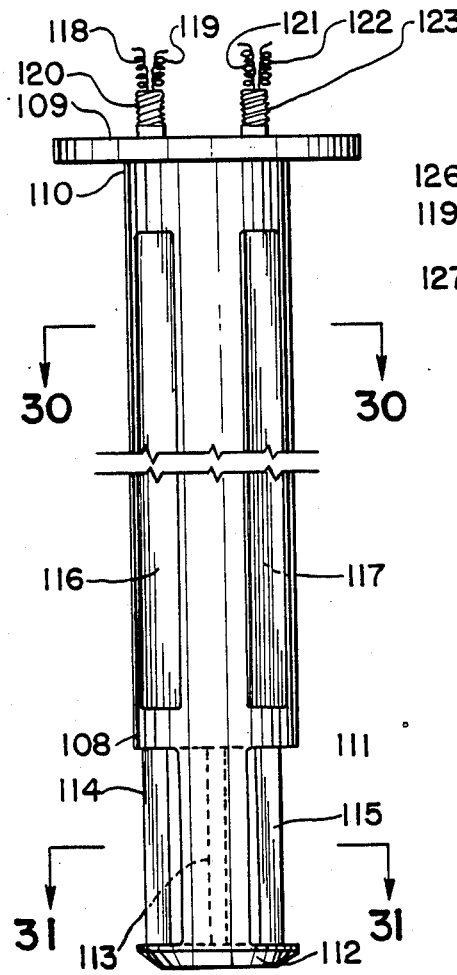
FIG. 29 illustrates a cross section of an insertion type vortex shedding flow meter constructed in accordance with the principles of the present invention.

In FIG. 29 there is illustrated an insertion type vortex shedding flow meter constructed in accordance with the principles of the present invention. The body 108 of the flow meter is constructed of a circular cylindrical bar with a mounting flange 109 affixed to one extremity 110 thereof. The flow passage 111 comprises an opening of a substantially rectangular shape disposed through the other extremity 112 of the cylindrical bar, wherein the central axis of the flow passage 111 is substantially perpendicular to the central axis of the cylindrical bar constituting the body of the flow meter. The vortex generating member 113 of an elongated structure having cross section of a blunt geometry is disposed across a cross section of the flow passage 111 intermediate two extremities of the flow passage in a configuration substantially parallel to the central axis of the cylindrical bar constituting the flow meter body 108. The two vortex sensing members 114 and 115 of an elongated structure with a substantially slender, elongated midportion are respectively disposed across a pair of cross sections of the flow passage 111 adjacent to the two extremities of the flow passage in a configuration substantially parallel to the vortex generating member 113, wherein the vortex generating member 113 is disposed intermediate the two vortex sensing members 114 and 115. The portion of the flow meter body intermediate the mounting flange 109 and the flow passage 111, that supports the assembly of the flow sensing apparatus installed within the flow passage 111 in an extending and overhanging relationship, includes a plurality of windows 116, 117, etc., which minimizes the obstruction of the flow of the fluid medium through a large diameter pipe, into which the insertion type vortex shedding flow meter is inserted.

The insertion type vortex shedding flow meter is inserted into the large diameter pipe through a hole included in a flange affixed on the pipe wall, to which flange the mounting flange 109 is secured to. In general, the insertion type vortex shedding flow meter is inserted in a 90 degree angle to the central axis of the pipe wherein the central axis of the flow passage 111 of the insertion type vortex shedding flow meter roughly lines up with the central axis of the pipe. The two pair of conducting wires 118 and 119, and 121 and 122, respectively, extending from the two transducer elements respectively installed in one stocky container member of the two vortex sensing members 114 and 115 are routed through two holes disposed in a rib included in the supporting section of the flow meter body 108 and exit therefrom through pair of wiring conduits 120 and 123.

Figure 30:
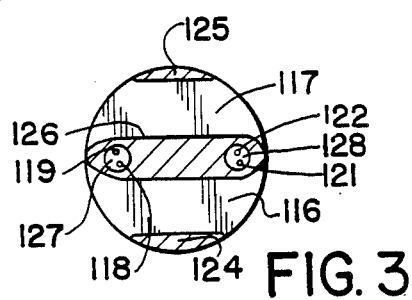
FIG. 30 illustrates a cross section of the insertion type vortex shedding flow meter shown in FIG. 29 taken along plane 30—30 as shown in FIG. 29.

In FIG. 30 there is illustrated a cross section of the insertion type vortex shedding flow meter shown in FIG. 29 taken along plane 30—30 as shown in FIG. 29. The windows 116 and 117 are cut out leaving a pair of slender ribs 124 and 125 on two diametrically opposite sides and a thick rib 126 therebetween, wherein the thick rib 126 includes a pair of axial holes 127 and 128 providing a conduit for the conducting wires 118 and 119, and 121 and 122. The leading and trailing edges of the ribs 124, 125 and 126 may be shaped to a roundness to enhance the smooth flow of the fluid medium therearound.

Figure 31:
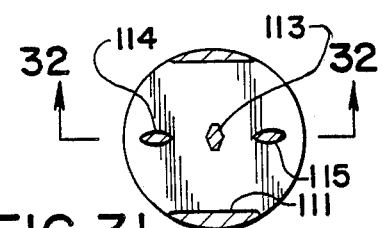
FIG. 31 illustrates another cross section of the insertion type vortex shedding flow meter shown in FIG. 29 taken along plane 31—31 as shown in FIG. 29.

In FIG. 31 there is illustrated a cross section of the flow passage 111 included in the insertion type vortex shedding flow meter shown in FIG. 29, which cross section is taken along plane 31—31 as shown in FIG. 29. The vortex generating member 113 and the two vortex sensing members 114 and 115 of the same construction as those elements shown in FIGS. 1-4, respectively, are installed within the flow passage 111 in the same way as described in conjunction with FIGS. 1-4.

Figure 32:
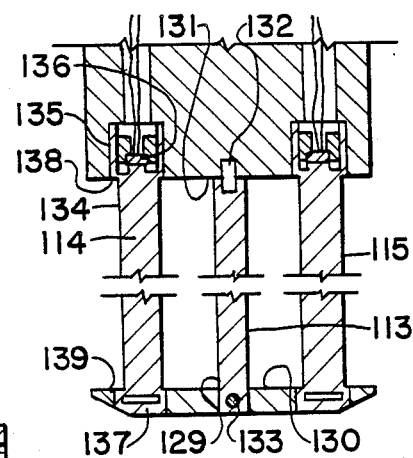
FIG. 32 illustrates a further cross section of the insertion type vortex shedding flow meter shown in FIG. 29 taken along plane 32—32 as shown in FIG. 31.

In FIG. 32 there is illustrated a cross section of the flow passage 111 including the vortex generating member 113 and the two vortex sensing members 114 and 115, which cross section is taken along plane 32—32 as shown in FIG. 31. The vortex generating member 113 engages and extends through a hole 129 disposed through the far side wall 130 of the flow passage 111, which is removably secured to the near side wall 131 of the flow passage 111 by at least one pin 132 disposed parallel to the central axis of the circular cylindrical member constituting the flow meter body 108 at one extremity and secured to the far side wall 130 of the flow passage by at least another pin or screw 133 disposed perpendicular to the central axis of the circular cylindrical body 108 at the other extremity thereof. Of course, the vortex generating member 113 may be weld connected to the walls of the flow passage.

The first vortex sensing members 114 including a slender, elongated midportion 134 and a first stocky container member 135 housing the transducer element 136 and a second stocky extremity 137 is secured to the near and far side walls of the flow passage 111 as the two stocky extremities respectively engage the two holes 138 and 139 included in the two opposite walls, respectively, wherein the two stocky extremities are permanently connected to the wall of the flow passage by welding as shown in the illustrated embodiment or may be removably connected by screw means. The second vortex sensing member 115 having the same construction as the first vortex sensing member 114 is installed in the same way as the first vortex sensing member 114 is installed. The insertion type vortex shedding flow meter operates in the same principles as those described in conjunction with FIGS. 1-4. The various embodiments of the vortex sensing member in the installation of the transducer element shown in FIGS. 4-15 and those in the construction of the junction where the slender, elongated midportion extends to the stocky extremity thereof shown in FIGS. 16-22 as well as the different cross section of the flat midsection shown in FIGS. 23-28 may be selectively and combinatively incorporated into the construction of the insertion type vortex shedding flow meter shown in FIGS. 29-32.

Figure 33:
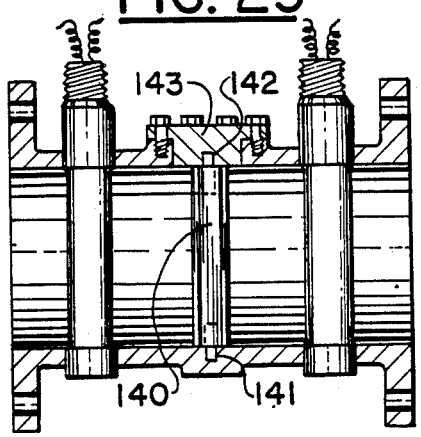
FIG. 33 illustrates a cross section of a vortex shedding flow meter constructed in accordance with the principles of the present invention wherein the vortex generating member is installed in a removable arrangement.

In FIG. 33, there is illustrated a cross section of a vortex shedding flow meter constructed in essentially the same way as that shown in FIG. 1 with one exception being that the vortex generating member 140 is removably secured to the wall of the flow passage by means of a plurality of pins 141, 142, etc. and an adapter cap 143 affixed to the flange or seat built in the pipe wall. As the vortex shedding frequency is directly proportional to the fluid velocity divided by the width of the cross section of the vortex generating member, it is imperative to check the change in the width of the vortex generating member due to abrasion or errosion or corrosion. Consequently, a removable installation of the vortex generating member provides an advantage over a permanent installation in view that the former installation enables one to examine and replace the vortex generating member.

Among all the details of the construction of the vortex shedding flow meter described in FIGS. 1-33, the mechanical preamplification of the vortex shedding signal, that is realized, firstly, by the airfoil like thin sections with "a large fluid dynamic surface area and a small mass" which produces measurable deflections created by the alternating lift forces resulting from the vortices and, secondly, the transmission of the alternating stresses resulting from the aforementioned deflections to the transducer element in an intensified form by the method of "stress concentration", is the single most important break-through in the technology related to the vortex shedding flow meters.

While the principles of the present invention have now been made clear by the illustrative embodiments, there will be immediately obvious to those skilled in the art many modifications in the structures, arrangement, proportions, elements and materials which are particularly adapted to the specific working environments and particular operating conditions in the practice of the invention without departing from those principles.

We claim:

1. A vortex shedding flowmeter comprising in combination:
   (a) a body including a wall that defines a flow passage extending from one extremity to the other extremity of said body;
   (b) vortex generating means for shedding periodic vortices in a flud flowing in said flow passage, said vortex generating means being disposed across a first cross-section of said flow passage and being oriented substantially perpendicular to the central axis of said flow passage;
   (c) a first vortex sensing member disposed across a second cross section of said flow passage substantially parallel to said vortex generating means, said first vortex sensing member having a slender, elongated midportion with a thin cross-sectional dimension oriented generally transverse to the central axis of said passage and a wide cross-sectional dimension oriented generally parallel to the central axis of said flow passage, one extremity of said slender, elongated midportion of said first vortex sensing member being supported by a flange of a thin diaphragm construction secured to a first stocky container member having a cavity therein adjacent to said flange of a thin diaphragm construction, said flange of a thin diaphragm construction providing an abrupt transition in the cross section from said slender, elongated midportion of said first vortex sensing member to said first stocky container member, said first stocky container member being secured to the wall of said flow passage;
   (d) at least one first transducer means contained within said cavity of said first stocky container member in contact with said flange of a thin diaphragm construction for converting alternating stresses on said flange of a thin diaphragm construction created by alternating lift forces on the slender, elongated midportion of said first vortex sensing member to an electrical signal when there is fluid in the flow passage flowing in a first direction from said vortex generating means to said first vortex sensing member such that the frequency of this electrical signal is a measure of velocity of the fluid flow in this first direction;
   (e) a second vortex sensing member disposed across a third cross section of said flow passage such that said vortex generating means is positioned between said first and second vortex sensing members with said second vortex sensing member also being in a substantially parallel relationship to said vortex generating means and having a slender, elongated midportion with a thin cross-sectional dimension oriented generally transverse to the central axis of said passage and a wide cross-sectional dimension oriented generally parallel to the central axis of said flow passage, one extremity of said slender, elongated midportion of said second vortex sensing member being supported by a flange of a thin diaphragm construction secured to a second stocky container member having a cavity therein adjacent to said flange of a thin diaphragm construction, said flange of a thin diaphragm construction providing an abrupt transition in the cross section from said slender, elongated midportion of said second vortex sensing member to said second stocky container member, said second container member being secured to the wall of said flow passage; and
   (f) at least one second transducer means contained within said cavity of said second stocky container member in contact with said flange of a thin diaphragm construction for converting alternating stresses on said flange of a thin diaphragm construction created by alternating lift forces on the slender, elongated midportion of said second vortex sensing member to an electrical signal when there is fluid in the flow passage flowing in a second direction from said vortex generating means to said second vortex sensing member such that the frequency of this electrical signal is a measure of velocity of the fluid flow in this second direction.

2. The combination as set forth in claim 1 wherein said combination includes a data processor means electrically connected to said first and second transducer means for converting vortex shedding frequency as measured by one of said electrical signals to flow data.

3. The combination as set forth in claim 1 wherein the other extremities of said respective slender, elongated midportions of said first and second vortex sensing members are secured to the wall of said flow passage.

4. The combination as set forth in claim 1 wherein the other extremities of said respective slender, elongated midportions of said first and second vortex sensing members are removably secured to the wall of said flow passage.

5. The combination as set forth in claim 1 wherein each of said first and second transducer means respectively comprises a pair of piezo-electric elements disposed opposite to one another on either side of a line defined by the intersection of said slender, elongated midportion with the diaphragm, wherein said pair of piezo-electric elements generates alternating electromotive forces across said pair of piezo-electric elements at the same frequencies as the alternating lift forces on said slender, elongated midportions of said vortex sensing members produced by the vortices shed by said vortex generating means.

6. The combination as set forth in claim 1 wherein signals from said first and second transducer means are combined to extract net signals generated by the shed vortices wherein signals generated by noises are canceled between signals from said first and second transducer means.

7. An insertion type vortex shedding flowmeter for mounting in the wall of a flow pipe, comprising in combination:
(a) an elongated cylindrical body having a flow passage extending transversely therethrough from one cylindrical side to the other cylindrical said of said body and disposed at one longitudinal extremity of said body, said body further including securing means disposed at the other longitudinal extremity of said body for securing said body to a pipe wall in such a manner that said body extends from the pipe wall toward a central portion of a cross section of the pipe so that the central axis of said flow passage generally lines up parallel to the central axis of the pipe;
(b) vortex generating means for shedding periodic vortices in said flow passage, said vortex generating means being disposed across a first cross-section of said flow passage and being oriented substantially perpendicular to the central axis of said flow passage;
(c) a first vortex sensing member disposed across a second cross section of said flow passage substantially parallel to said vortex generating means, said first vortex sensing member having a slender, elongated midportion with a thin cross-sectional dimension oriented generally transverse to the central axis of said passage and a wide cross-sectional dimension oriented generally parallel to the central axis of said flow passage, one extremity of said slender, elongated midportion of said first vortex sensing member being supported by a flange of a thin diaphragm construction secured to a first stocky container member having a cavity adjacent to said flange of a thin diaphragm construction, said flange of a thin diaphragm construction providing an abrupt transition in the cross section from said slender, elongated midportion of said first vortex sensing member to said first stocky container member, said first stocky container member being secured to the wall of said flow passage;
(d) at least one first transducer means contained within said cavity of said first stocky container member in contact with said flange of a thin diaphragm construction for converting alternating stresses on said flange of a thin diaphragm construction created by alternating lift forces on the slender, elongated midportion of said first vortex sensing member to an electrical signal when there is fluid in the flow passage flowing in a first direction from said vortex generating means to said vortex sensing member such that the frequency of this electrical signal is a measure of velocity of the fluid flow in this first direction;
(e) a second vortex sensing member disposed across a third cross section of said flow passage such that said vortex generating means is positioned between said first and second vortex sensing members with said second vortex sensing member also being in a substantially parallel relationship to said vortex generating means and having a slender, elongated midportion with a thin cross-sectional diemension oriented generally transverse to the central axis of said passage and a wide cross-sectional dimension oriented generally parallel to the central axis of said flow passage, one extremity of said slender, elongated midportion of said second vortex sensing member being supported by a flange of a thin diaphragm construction secured to a second stocky container member having a cavity therein adjacent to said flange of a thin diaphragm construction, said flange of a thin diaphragm construction providing an abrupt transition in the cross section from said slender, elongated midportion of said second vortex sensing member to said second stocky container member, said second container member being secured to the wall of said flow passage; and
(f) at least one second transducer means contained within said cavity of said second stocky container member in contract with said flange of a thin diaphragm construction for converting alternating stresses on said flange of a thin diaphragm construction created by alternating lift forces on the slender, elongated midportion of said second vortex sensing member to an electrical signal when there is fluid in the flow passage flowing in a second direction from said vortex generating means to said second vortex sensing member such that the frequency of this electrical signal is a measure of velocity of the fluid flow in this second direction.

8. The combination as set forth in claim 7 wherein said combination includes a data processor that converts vortex shedding frequency as measured by one of said electrical signals to flow data.

9. The combination as set forth in claim 7 wherein the other extremities of said respective slender, elongated midportions of said first and second vortex sensing members are secured to the wall of said flow passage.

10. The combination as set forth in claim 7 wherein the other extremities of said respective slender, elongated midportions of said first and second vortex sensing members are removably secured to the wall of said flow passage.

11. The combination as set forth in claim 7 wherein said first and second transducer means respectively comprise a pair of piezo-electric elements disposed opposite to one another on either side of a line defined by the intersection of said slender, elongated midportion with the diaphragm, wherein said pair of piezo-electric elements generates alternating electromotive forces across said pair of piezo-electric elements at the same frequencies as the alternating lift forces on said slender, elongated midportions of said vortex sensing members produced by the vortices shed by said vortex generating means.

12. The combination as set forth in claim 7 wherein signals from said first and second transducer means are combined to extract net signals generated by the shed vortices wherein signals generated by noisses are canceled between signals from said first and second transduceer means.

* * * * *

UNITED STATES PATENT AND TRADEMARK OFFICE
CERTIFICATE OF CORRECTION

PATENT NO. : 4,703,659

DATED : November 3, 1987

INVENTOR(S) : Hyok S. Lew and Louis T. Yoshida

It is certified that error appears in the above-identified patent and that said Letters Patent is hereby corrected as shown below:

Title page:

In the Abstract:

In Line 4, delete "wings" and substitute --slender, elongated midportion--.
In Line 5, delete "section" and substitute --sections--.
In Line 7, delete "wing" and substitute --slender, elongated midportion--.
In Line 12, delete "wing" and substitute --slender, elongated midportion--.

In the Specification:

In Column 1, Line 44, delete "shedder" and substitute --shedding--.
In Column 3, Line 68, delete "connection" and substitute --connections--.
In Column 6, Line 12 & 13, delete "flat midsection" and substitute --slender, elongated midportion--.
In Column 6, Line 27, delete "sensign" and substitute --sensing--.
In Column 6, Line 63, delete "ia" and substitute --is--.
In Column 7, Line 17, delete "wing" and substitute --slender, elongated midportion--.
In Column 9, Line 65, delete "noches" and substitute --notches--.
In Column 10, Line 18, delete "flat midsection" and substitute --slender, elongated midportion--.
In Column 12, Line 67, delete "flat midsection" and substitute --slender, elongated midportion--.

In the Claims:

In Claim 1, Column 13, Line 48, delete "flud" and substitute --fluid--.
In Claim 7, Column 15, Line 23, delete "said" and substitute --side--. (1st occurrence)
In Claim 7, Column 15, Line 68, delete "vortex" and substitute --first vortex--.
In Claim 12, Column 16, Line 65, delete "noisses" and substitute --noises--.

UNITED STATES PATENT AND TRADEMARK OFFICE
CERTIFICATE OF CORRECTION

PATENT NO. : 4,703,659

DATED : November 3, 1987

INVENTOR(S) : Hyok S. Lew and Louis T. Yoshida

It is certified that error appears in the above-identified patent and that said Letters Patent is hereby corrected as shown below:

In Claim 12, Column 16, Line 66 & 67 delete "transduceer" and substitute --transducer--.

Signed and Sealed this

Eighteenth Day of April, 1989

Attest:

Attesting Officer

DONALD J. QUIGG

Commissioner of Patents and Trademarks